United States Patent
Ikeya et al.

(10) Patent No.: US 9,772,214 B2
(45) Date of Patent: Sep. 26, 2017

(54) LIQUID LEVEL DETECTOR

(71) Applicant: AISAN KOGYO KABUSHIKI KAISHA, Obu-shi (JP)

(72) Inventors: Masaki Ikeya, Obu (JP); Takahiro Nakamura, Anjo (JP)

(73) Assignee: AISAN KOGYO KABUSHIKI KAISHA, Obu-shi (JP)

( * ) Notice: Subject to any disclaimer, the term of this patent is extended or adjusted under 35 U.S.C. 154(b) by 59 days.

(21) Appl. No.: 15/014,594

(22) Filed: Feb. 3, 2016

(65) Prior Publication Data

US 2016/0231160 A1 Aug. 11, 2016

(30) Foreign Application Priority Data

Feb. 5, 2015 (JP) .................................. 2015-020955

(51) Int. Cl.
*G01F 23/28* (2006.01)
*G01F 23/38* (2006.01)

(52) U.S. Cl.
CPC .................................... *G01F 23/38* (2013.01)

(58) Field of Classification Search
CPC ........... B60K 2015/03217; G01F 23/38; G01F 23/32; G01F 23/34; G01F 23/363; G01F 23/54; G01F 23/36; G01F 23/62
See application file for complete search history.

(56) References Cited

U.S. PATENT DOCUMENTS

| 3,669,295 A * | 6/1972 | Horvath | B65D 43/0208 215/206 |
| 4,229,973 A * | 10/1980 | Hara | G01F 23/32 73/317 |
| 6,161,711 A * | 12/2000 | Miceli | B65D 50/061 215/206 |
| 6,401,533 B1 * | 6/2002 | Gier | B60K 15/077 73/313 |
| 6,453,741 B1 * | 9/2002 | Beck, II | G01F 23/38 340/623 |

(Continued)

FOREIGN PATENT DOCUMENTS

| JP | 2006-208211 A | 8/2006 |
| JP | 2007-183241 A | 7/2007 |

(Continued)

*Primary Examiner* — David A Rogers
(74) *Attorney, Agent, or Firm* — Shumaker, Loop & Kendrick, LLP

(57) ABSTRACT

A liquid level detector may comprise an arm attached to a float, a rotator fixed to the arm, a magnet fixed to the rotator, a supporter rotatably supporting the rotator. The supporter may comprise a body housing a magnetic sensor and opposing the magnet with a clearance, a supporting portion disposed along a rotation direction of the arm on an outer circumference side of the magnet and projecting from the body toward the rotator, and a flange portion projecting from the supporting portion along an outer circumference direction at a position spaced from the body in a rotational axial direction of the arm. The rotator may comprise an engaging portion slidably disposed relative to the flange portion along the rotation direction of the arm and engaging the flange portion so as to regulate a motion of the arm in the rotational axial direction.

5 Claims, 4 Drawing Sheets

(56) References Cited

U.S. PATENT DOCUMENTS

| | | | |
|---|---|---|---|
| 6,564,632 B2* | 5/2003 | Ross, Jr. | G01F 23/38 73/290 R |
| 6,679,116 B2* | 1/2004 | Ross, Jr. | G01F 23/34 73/290 R |
| 6,851,315 B2* | 2/2005 | Bergsma | G01F 23/363 73/290 R |
| 6,976,394 B2* | 12/2005 | Kleinen | G01F 23/38 116/227 |
| 7,093,485 B2* | 8/2006 | Newman | G01F 23/32 73/317 |
| 7,165,450 B2* | 1/2007 | Jamnia | G01F 23/38 73/317 |
| 7,201,052 B2* | 4/2007 | Lee | G01F 23/38 73/317 |
| 7,377,163 B2* | 5/2008 | Miyagawa | G01F 23/38 73/305 |
| 7,458,261 B2* | 12/2008 | Miyagawa | G01F 23/363 73/290 R |
| 7,673,509 B2* | 3/2010 | Cochran | G01F 23/38 73/311 |
| 8,136,396 B2* | 3/2012 | Mundo | G01F 23/38 73/317 |
| 8,671,750 B2* | 3/2014 | Fukuhara | G01F 23/38 73/314 |
| 9,453,756 B2* | 9/2016 | Ogasawara | G01F 23/38 |
| 2004/0003660 A1* | 1/2004 | Fukuhara | G01F 23/38 73/319 |
| 2004/0182150 A1* | 9/2004 | Okada | G01F 23/36 73/313 |
| 2004/0231416 A1* | 11/2004 | Kumagai | G01F 23/38 73/313 |
| 2005/0103103 A1* | 5/2005 | Newman | G01F 23/32 73/313 |
| 2005/0146323 A1* | 7/2005 | Kleinen | G01R 33/07 324/207.26 |
| 2006/0272405 A1* | 12/2006 | Feher | G01F 23/38 73/313 |
| 2007/0090832 A1 | 4/2007 | Yasuda et al. | |
| 2007/0290681 A1* | 12/2007 | Yasuda | G01F 23/38 324/207.25 |
| 2008/0202231 A1* | 8/2008 | Sohn | G01F 23/38 73/317 |
| 2008/0231267 A1* | 9/2008 | Miyagawa | G01F 23/38 324/207.25 |
| 2012/0011931 A1* | 1/2012 | Ichisawa | G01F 23/38 73/317 |
| 2015/0107355 A1* | 4/2015 | Iryo | G01F 23/72 73/313 |
| 2015/0308880 A1 | 10/2015 | Go et al. | |
| 2015/0338263 A1* | 11/2015 | Iryo | G01F 23/38 73/317 |
| 2016/0161321 A1* | 6/2016 | Miyagawa | G01F 23/38 73/317 |
| 2016/0178427 A1* | 6/2016 | Tesar | G01F 23/38 73/313 |

FOREIGN PATENT DOCUMENTS

| | | |
|---|---|---|
| JP | 2007-315873 A | 12/2007 |
| JP | 2011-064491 A | 3/2011 |
| JP | 2014-137298 A | 7/2014 |
| JP | 2015-087218 A | 5/2015 |
| JP | 2015-117968 A | 6/2015 |
| JP | 2015-210153 A | 11/2015 |

* cited by examiner

LIQUID LEVEL DETECTOR

CROSS-REFERENCE TO RELATED APPLICATION

This application claims priority to Japanese Patent Application No. 2015-020955 filed on Feb. 5, 2015, the contents of which are hereby incorporated by reference into the present application.

TECHNICAL FIELD

An art disclosed herein relates to a liquid level detector configured to detect a level of liquid (for example, a device configured to detect an amount of fuel stored in a fuel tank of an automobile or the like).

BACKGROUND

Japanese Patent Application Publication No. 2014-137298 discloses a fuel level gauge. The fuel level gage includes a rotator that rotates about a central axis, a fixing member that rotatably holds the rotator, a float that floats on a surface of fuel, and an arm that converts a vertical motion of the float into a rotary motion of the rotator. Two magnets fixed to the rotator. The magnets rotate about the central axis of the rotator. Each magnet is disposed to be spaced from the central axis of the rotator. A Hall element is housed in the fixing member.

A shaft hole is formed in the rotator coaxially with the central axis of the rotator. The shaft hole has a hole diameter smaller than a distance between the central axis of the rotator and each of the magnets. The fixing member has a shaft portion coaxially with the shaft hole. The shaft portion is fitted into the shaft hole to thereby allow the fixing member to rotatably hold the rotator.

SUMMARY

In order for the rotator to smoothly rotate relative to the fixing member, a clearance is provided between engaging parts of the rotator and the fixing member (in the above-described art, between the shaft portion and the shaft hole). If the engaging parts of the rotator and the fixing member are located close to the central axis, fairly large backlash rattling of the rotator relative to the fixing member occurs due to the clearance between the engaging parts.

The present disclosure provides an art to suppress the backlash rattling of the rotator relative to the fixing member.

The application discloses a liquid level detector. The liquid level detector may comprise: a float; an arm attached to the float and configured to convert a vertical motion of the float into a rotary motion of the arm; a rotator fixed to the arm at a rotation center of the arm; a magnet fixed to the rotator; a supporter rotatably supporting the rotator; and a magnetic sensor covered by the supporter and configured to output a signal corresponding to a rotation of the magnet opposing the magnetic sensor via the supporter. The supporter may comprise: a body housing the magnetic sensor and opposing the magnet with a clearance between the body and the magnet; a supporting portion disposed along a rotation direction of the arm on an outer circumference side of the magnet and projecting from the body toward the rotator; and a flange portion projecting from the supporting portion along an outer circumference direction at a position spaced from the body in a rotational axial direction of the arm. The rotator may comprise: an engaging portion slidably disposed relative to the flange portion along the rotation direction of the arm and engaging the flange portion so as to regulate a motion of the arm in the rotational axial direction.

In the above-described liquid level detector, the flange portion and the engaging portion, which engage each other, are disposed on the outer circumference side of the magnet. According to this configuration, the rotator may rotate while engaging the supporter at a position relatively far from the rotation center. Accordingly, it is possible to suppress the backlash rattling of the rotator relative to the fixing member due to the clearance between the flange portion and the engaging portion.

DETAILED DESCRIPTION

Figure 1:
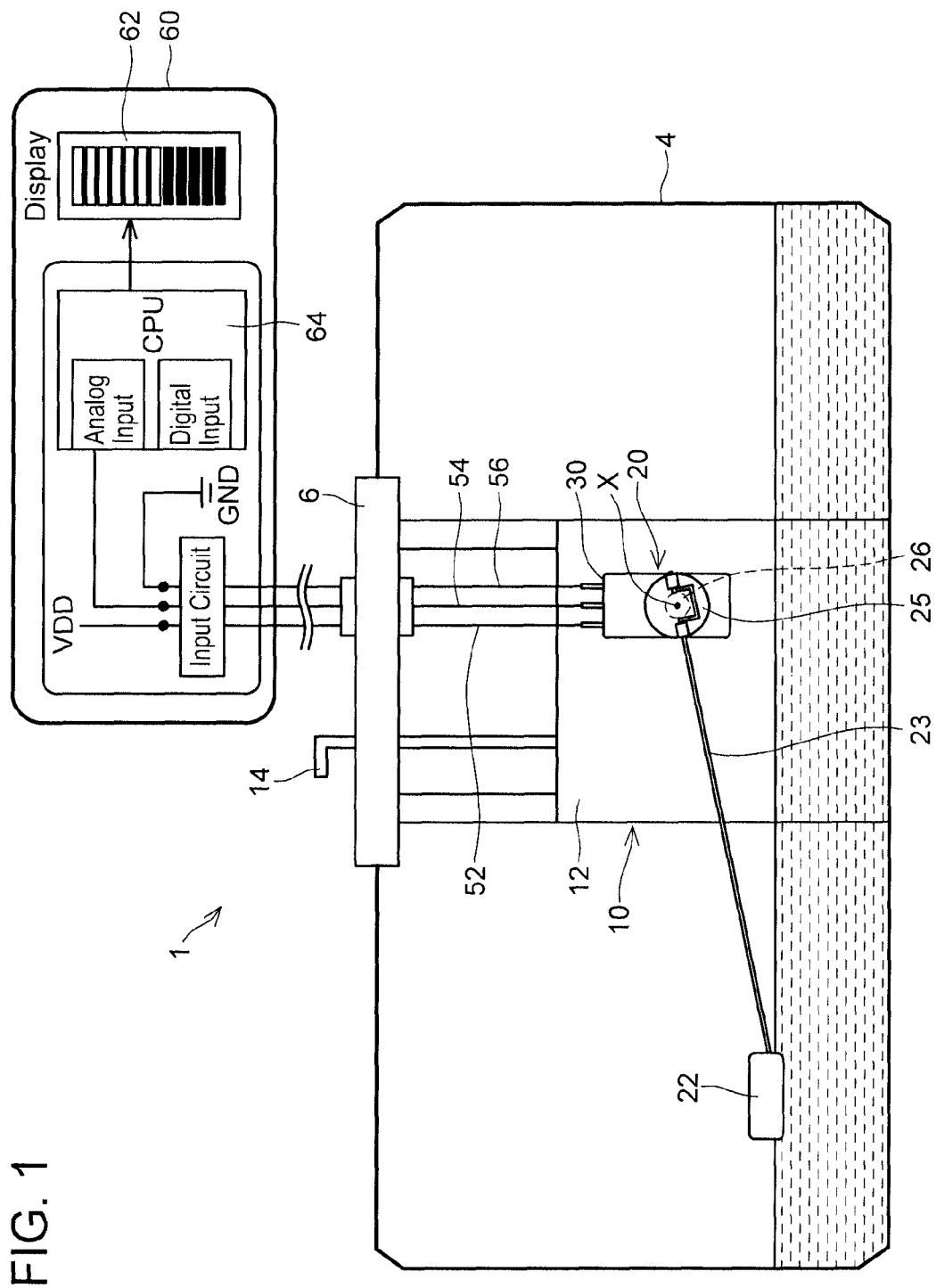
FIG. 1 shows a configuration of a fuel supply system.

Some features of embodiments described herein will be listed. Notably, technical features described herein are each independent technical element, and exhibit technical usefulness thereof solely or in combinations.

Feature 1

In a liquid level detector, a supporting portion may have a cylindrical shape. The supporting portion may comprise a communication opening communicating an inner circumference side of the supporting portion and an outer circumference side of the supporting portion. The communication opening may be disposed on a body side of the flange portion. According to this configuration, the clearance between the magnet and the body communicates with an outside of the supporting portion via the communication opening. Consequently, foreign substances mixed with the fuel can be prevented from residing in the clearance between the magnet and the body.

Feature 2

In the liquid level detector, a flange portion may be disposed on an end of the supporting portion. The end may be opposite to the body. The supporter may comprise a notch arranged across the supporting portion and flange portion and extending from the communication opening to an end, located opposite the body, of the flange portion. A length of the engaging portion along the rotation direction of the arm may be shorter than a length of the notch along the rotation direction of the arm. According to this configuration, if the rotator is to be assembled to the supporter, the flange portion is inserted into the notch and the rotator is rotated relative to the supporter, to thereby achieve easy assembly of the rotator to the supporter.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved liquid level detectors, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

First Embodiment

As shown in FIG. 1, a fuel supply system 1 is a system configured to supply, to an internal combustion engine not illustrated, fuel in a fuel tank 4 mounted in an automobile. In the present embodiment, the fuel is gasoline, or a mixed fuel containing gasoline and alcohol (e.g., ethanol). The fuel supply system 1 includes a fuel meter 60 and a fuel pump module 10. The fuel meter 60 is used for a display device of the automobile, not illustrated.

The fuel pump module 10 is disposed in the fuel tank 4. The fuel meter 60 and the fuel pump module 10 are electrically connected by a plurality of lines 52, 54, and 56.

The fuel pump module 10 includes a fuel pump unit 12 and a fuel amount detector 20. The fuel pump unit 12 is housed in the fuel tank 4. The fuel pump unit 12 is attached to a set plate 6 configured to close an opening in the fuel tank 4. The fuel pump unit 12 sucks in the fuel in the fuel tank 4, pressurizes the fuel thus sucked in, and discharges the fuel. The fuel discharged from the fuel pump unit 12 is supplied to the engine through a discharge port 14.

The fuel amount detector 20 includes a float 22, an arm 23 to which the float 22 is fixed, and a magnetic sensor unit 30 configured to detect a rotation angle of the arm 24. The float 22 floats on the surface of the fuel in the fuel tank 4 and moves up and down depending on the liquid level of the fuel. The float 22 is rotatably attached to a leading end of the arm 23. A base end of the arm 23 is supported to be rotatable with respect to the magnetic sensor unit 30. For this reason, when the float 22 moves up and down depending on the liquid level of the fuel in the fuel tank 4, the arm 23 thereby swingably rotates with respect to the fuel pump unit 12.

The arm 23 is configured of a metal that has a resistance to fuel, such as stainless steel, for example. The float 22 is attached to the leading end of the arm 23. A rotator 25 is attached to the base end of the arm 23.

The magnetic sensor unit 30 revolvably supports the arm 23. The magnetic sensor unit 30 includes the rotator 25, a supporter 24, a magnetic sensor 40, and lead wires 32.

Figure 2:
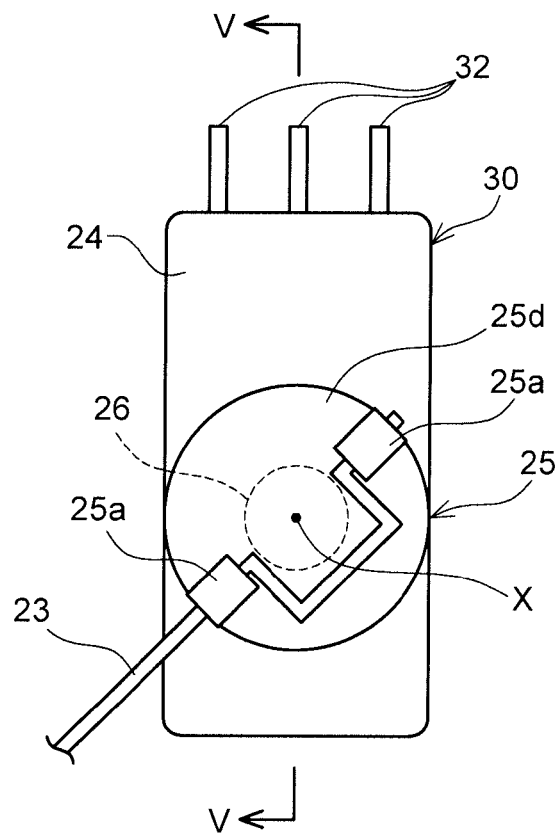
FIG. 2 is a front view of a magnetic sensor unit.
Figure 5:
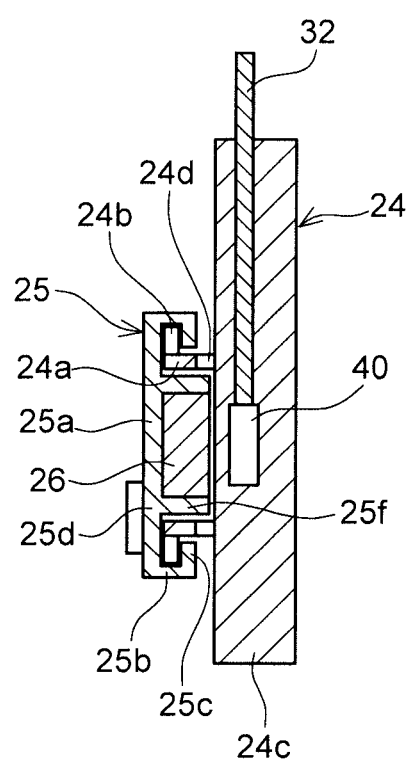
FIG. 5 is a cross-sectional view taken along a V-V cross-section of FIG. 2.

As shown in FIGS. 2 and 5, the rotator 25 is configured of a resin such as POM. Notably, in FIG. 5, the arm 23 is not illustrated. The rotator 25 includes a flat-plate portion 25d, two arm-holding portions 25a, an outer circumference wall 25b, an engaging portion 25c, and a magnet-holding portion 25f. The flat-plate portion 25d has a disk shape. The two arm-holding portions 25a are attached to a front surface of the flat-plate portion 25d. The two arm-holding portions 25a are disposed at both ends of a diameter of the flat-plate portion 25d, respectively. In other words, the two arm-holding portions 25a are disposed at outer circumference ends of the flat-plate portion 25d, respectively, with the rotation center X of the arm 23 interposed therebetween.

The two arm-holding portions 25a, along with the flat-plate portion 25d, clamp a base end part of the arm 23, to thereby hold the arm 23. Notably, the base end part of the arm 23 is bent between the two arm-holding portions 25a. The arm 23 can thereby be prevented from displacing relative to the arm-holding portions 25a in an axial direction of the arm 23.

Figure 4:
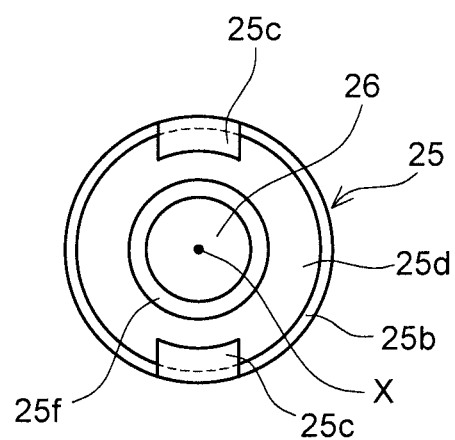
FIG. 4 shows a supporter side surface of a rotator.

As shown in FIG. 4, the outer circumference wall 25b is disposed at a back surface of the flat-plate portion 25d. The outer circumference wall 25b extends so as to form a circle along an outer circumference edge of the flat-plate portion 25d. The outer circumference wall 25b has a cylindrical shape that extends vertically from the back surface of the flat-plate portion 25d. Notably, a dashed line in FIG. 4 represents an inner circumference surface of the outer circumference wall 25b. The two engaging portions 25c are disposed at an end of the outer circumference wall 25b opposite to the flat-plate portion 25d. The two engaging portions 25c project from the end of the outer circumference wall 25b toward the inner circumference side. An inner circumference end of each engaging portion 25c has an arc shape along the rotation direction of the arm 23.

At the back surface of the flat-plate portion 25d, the magnet-holding portion 25f is further disposed on the inner circumference side of the engaging portions 25c. The magnet-holding portion 25f has a cylindrical shape that has a central axis passing through the rotation center X vertically to the flat-plate portion 25d. The magnet-holding portion 25f is disposed with a clearance between itself and each of the inner circumference ends of the engaging portions 25c.

A magnet 26 is disposed on an inner circumference side of the magnet-holding portion 25f. The magnet 26 is held by being fitted into the inner circumference side of the magnet-holding portion 25f. The magnet 26 is a permanent magnet. The magnet 26 has a disk shape. When the magnetic sensor unit 30 is viewed from the front, the center of the magnet 26 coincides with the rotation center X. The magnet 26 has an N pole in one semicircular part and an S pole in the other semicircular part. The magnet 26 rotates as the arm 23 swingably rotates. Consequently, an orientation of a magnetic field generated by the magnet 26 changes as the arm 23 swingably rotates.

Figure 3:
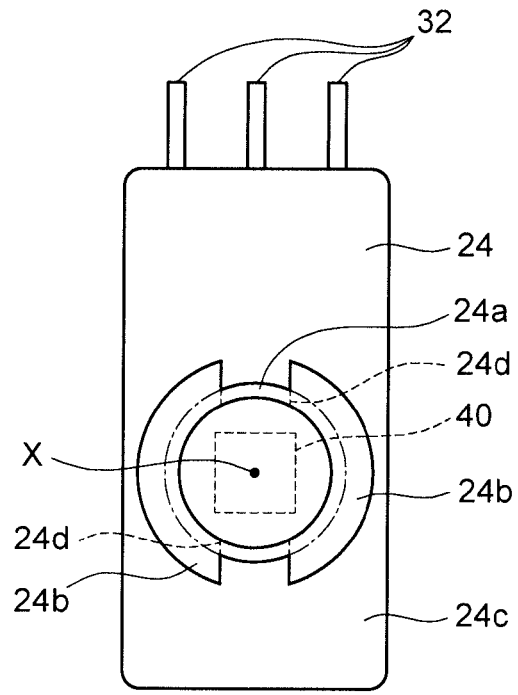
FIG. 3 is a plain view of a supporter.

The rotator 25 is rotatably supported by the supporter 24. As shown in FIGS. 3 and 5, the supporter 24 is configured of a resin such as PPS. The supporter 24 includes a body 24c, a supporting portion 24a, and flange portions 24b. The body 24c has a flat-plate shape. A back surface of the body 24c is in contact with the fuel pump unit 12. The supporting portion 24a is disposed at a front surface of the body 24c.

The supporting portion 24a is disposed along the rotation direction of the arm 23. Notably, long and short dashed lines in FIG. 3 represent an outer circumference surface of the supporting portion 24a. The supporting portion 24a has a cylindrical shape that projects vertically from the front surface of the body 24c. The central axis of the supporting portion 24a passes through the rotation center X. The supporting portion 24a is disposed on an outer circumference side of the magnet-holding portion 25f, and is opposed to an outer circumference surface of the magnet-holding portion 25f with a slight spacing. Moreover, the supporting portion 24a is disposed on the inner circumference side of the engaging portions 25c, and is opposed to inner circumference ends of the engaging portions 25c with a slight spacing. At an end part of the supporting portion 24a on the body 24c's side, two communication openings 24d are disposed, which allow the inner and outer circumferences of the supporting portion 24a to communicate with each other. The two communication openings 24d are disposed at upper and lower ends of the supporting portion 24a, respectively.

At an end of the supporting portion 24a opposite to the body 24c, the two flange portions 24b are disposed. The two flange portions 24b are disposed on both sides with the rotation center X interposed therebetween. The two flange portions 24b have shapes identical to each other, and are disposed in rotational symmetry with the rotation center X. Each of the flange portions 24b has a partially-annular shape along the rotation direction of the arm 23. A length of a spacing between one end of the one flange portion 24b and one end of the other flange portion 24b, along the rotation direction of the arm 23, is somewhat larger than a length of the engaging portions 25c along the rotation direction of the arm 23. According to this configuration, as shown in FIGS. 3 and 4, if the rotator 25 is to be attached to the supporter 24, the two engaging portions 25c are aligned with the clearances of the two flange portions 24b, respectively, and the engaging portions 25c are allowed to pass through between the two flange portions 24b, and then the rotator 25 is rotated. Easy attachment of the rotator 25 to the supporter 24 can thereby be achieved.

Inner circumference surfaces of the flange portions 24b are located coplanar with the inner circumference surface of the supporting portion 24a, and outer circumference surfaces of the flange portions 24b extend on an outer circumference side of the outer circumference surface of the supporting portion 24a. The outer circumference surfaces of the flange portions 24b are disposed with a slight clearance from the inner circumference surface of the outer circumference wall 25b. The flange portions 24b are disposed between the flat-plate portion 25d and the engaging portion 25c. The flange portion 24b is opposed to the flat-plate portion 25d and the corresponding engaging portion 25c, with slight clearances, respectively.

The body 24c houses the magnetic sensor 40. The magnetic sensor 40 is disposed at a position opposed to the magnet 26, with the body 24c interposed therebetween. The magnetic sensor 40 detects a rotary motion of the arm 23, and based on that detected result, outputs to a fuel meter (not illustrated) a signal that represents an analog amount corresponding to a liquid level of fuel stored in the fuel tank 4 (see FIG. 1). The signal that represents an analog amount is, for example, an analog voltage signal, a signal through PWM (an abbreviation of Pulse Width Modulation), a signal transmitted with use of digital communication such as CAN (an abbreviation of Controller Area Network) or LAN (an abbreviation of Local Area Network), and the like. The magnetic sensor 40 is a magnetic-type sensor that detects a rotation angle of the arm 23, and a known sensor that utilizes a Hall IC, for example, can be used therefor. The three lead wires 32 extend from the magnetic sensor 40. The three lead wires 32 are connected to a power source line 52, an output line 54, and a ground line 56, respectively. The power source line 52, the output line 54, and the ground line 56 penetrate the set plate 6 and are connected to the fuel meter 60.

As shown in FIG. 1, the fuel meter 60 has a CPU 64 and a display 62. The CPU 64 supplies power source to the fuel liquid level detector 20, particularly to the magnetic sensor 40, via the power source line 52. The signal output from the magnetic sensor 40 is input to the CPU 64 via the output line 54. The CPU 64 uses the signal input from the magnetic sensor 40, determines an amount of fuel stored in the fuel tank 4, and displays on the display 62 the fuel amount thus determined. The CPU 64 and the display 62 can be configured as in the ones in the conventionally-known fuel meter, respectively. Notably, the ground line 56 is grounded in the CPU 64.

Liquid Amount Detecting Method

Next, a liquid amount detecting method will be described. The CPU 64 supplies electric power to the magnetic sensor 40 while the automobile is driven (i.e., while the engine is running). The magnetic sensor 40 outputs a signal corresponding to an orientation of a magnetic field of the magnet 26. When the liquid level of the fuel in the fuel tank 4 changes, the float 22 moves in vertical directions, and the arm 23 rotates as the float 22 moves in the vertical directions. The magnet 26 rotates on its axis as the arm 23 rotates. Consequently, the orientation of the magnetic field of the magnet 26 changes depending on the rotation of the arm 23, in other words, the liquid level of the fuel in the fuel tank 4. Accordingly, the signal output from the magnetic sensor 40 is correlated with the liquid level of the fuel in the fuel tank 4.

When the signal output from the magnetic sensor 40 is input to the CPU 64, the CPU 64 determines an amount of the fuel stored in the fuel tank 4, and displays on the display 62 the fuel amount thus determined. In particular, the CPU 64 uses a database or a function that is stored in the CPU 64 and shows a relation between a signal output from the magnetic sensor 40 and a fuel amount, to thereby determine the fuel amount. The database or the function is predetermined by execution of an experiment or a simulation, and stored in the CPU 64.

In the above-described fuel liquid level detector 20, the engaging portions 25c engage with the flange portions 24b to thereby allow the flange portions 24b to be clamped by the engaging portions 25c and the flat-plate portion 25d. A motion of the rotator 25 relative to the supporter 24 in the rotational axial direction is thereby regulated. Moreover, the outer circumference surface of the magnet-holding portion 25f and the inner circumference surface of the supporting portion 24a, or inner circumference surfaces of the engaging portions 25c and the outer circumference surface of the supporting portion 24a, or the inner circumference surface of the outer circumference wall 25b and the outer circumference surfaces of the flange portions 24b slide, to thereby cause the rotator 25 to rotate relative to the supporter 24. Clearances are provided between the outer circumference surface of the magnet-holding portion 25f and the inner circumference surface of the supporting portion 24a, between the inner circumference surfaces of the engaging portions 25c and the outer circumference surface of the supporting portion 24a, and between the inner circumference surface of the outer circumference wall 25b and the outer circumference surfaces of the flange portions 24b, respectively. Moreover, clearances are also provided between the engaging portions 25c and the flange portions 24b, and between the flat-plate portion 25d and the flange portions 24b, respectively. Accordingly, the rotator 25 can rotate smoothly relative to the supporter 24.

On the other hand, the above-described clearances between the supporter 24 and the rotator 25 cause backlash rattling of the rotator 25 relative to the supporter 24. In the above-described fuel liquid level detector 20, the magnet-holding portion 25f, the engaging portion 25c, the supporting portion 24a, and the flange portion 24b are located on the outer circumference side of the magnet 26, and in the vicinity of an outer circumference end of the rotator 25. Accordingly, the backlash rattling due to the clearance between the supporter 24 and the rotator 25 (i.e., changes in angle of the rotator 25 relative to the supporter 24) can be suppressed to be smaller than that in the case where the clearance between the supporter 24 and the rotator 25 is located in the vicinity of the rotation center X.

Moreover, the two communication openings 24d of the supporter 24 are disposed at the upper and lower ends of the supporting portion 24a, respectively. According to this configuration, the fuel can be made to smoothly flow in the clearance between the magnet 26 and the body 24c. Consequently, foreign substances mixed with the fuel can be prevented from residing in the clearance between the magnet 26 and the body 24c. According to this configuration, it is possible to suppress a decrease in detection accuracy of the fuel liquid level detector 20, the decrease being caused by the foreign substances in the clearance between the magnet 26 and the body 24c. In the case where a relatively few foreign substances are contained in the fuel, this configuration can further prevent the foreign substances from residing in the clearance between the magnet 26 and the body 24c, in comparison with a configuration in which the route to the clearance between the magnet 26 and the body 24c and to the outside is narrowed to thereby prevent the foreign substances from entering.

Moreover, bubbles can be prevented from building up at sliding parts of the supporter 24 and the rotator 25. Moreover, one of the communication openings 24d is disposed in an upward direction, and hence bubbles are easily discharged from the clearance between the magnet 26 and the body 24c. Furthermore, the other of the communication openings 24d is disposed in a downward direction and hence foreign substances easily fall down by gravity.

Second Embodiment

Figure 6:
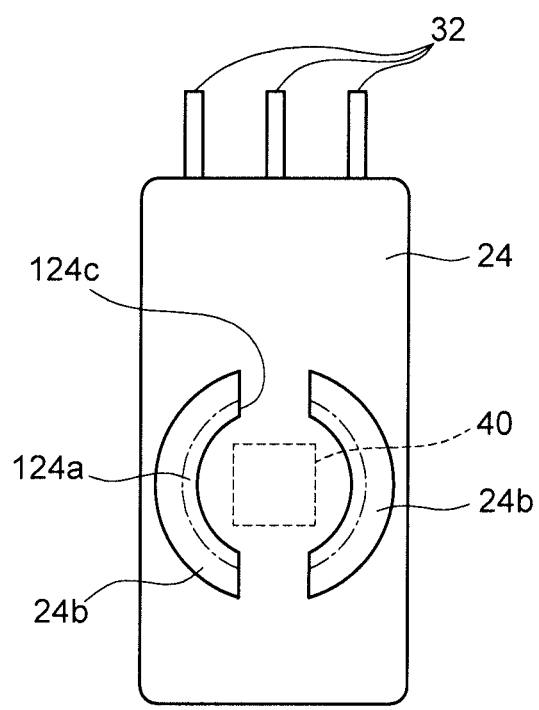
FIG. 6 is a plain view of a supporter of a second embodiment.

With reference to FIG. 6, a difference from the first embodiment will be described. In the fuel liquid level detector 20 in a second embodiment, the shape of a supporting portion 124a differs from that of the supporting portion 24a. Notably, long and short dashed lines in FIG. 6 represent an outer circumference surface of the supporting portion 124a. The supporting portion 124a has a notch 124c that extends from an end of the communication opening 24d opposite to the body 24c and reaches an end of the supporting portion 124a opposite to the body 24c. In other words, the supporting portion 124a has two partially-cylindrical shapes that have the central axis passing through the rotation center X. Notably, the supporting portion 124a may have three or more partially-cylindrical shapes. Alternatively, the supporting portion 124a may be a plurality of projecting portions that are disposed to be spaced from each other along the rotation direction of the arm 23. The projecting portions may project from the body 24c.

Variation 1

In each of the above-described embodiments, the flange portion 24b has two annular shapes. However, the flange portion 24b may be encircled in the rotation direction of the arm 23. Alternatively, the flange portion 24b may be a plurality of projecting portions that project from the supporting portion 24a in the outer circumference direction. The plurality of the projecting portions may be disposed to be spaced from each other.

Variation 2

In each of the above-described embodiments, the magnet 26 is exposed from the rotator 25. However, the magnet 26 may be housed in the rotator 25. According to this configuration, the magnet 26 can be configured of a material that has a low resistance to the fuel.

Variation 3

The communication openings 24d of the supporting portions 24a and 124a are disposed upward and downward in the supporting portions 24a and 124a. However, the shape, the number, and the position of the communication openings are not limited. For example, the communication openings 24d may be disposed in the supporting portion 24a in horizontal directions.

Variation 4

The "liquid level detector" in the present disclosure may be a device that detects an amount of liquid in a container, for example, an amount of water stored in a water storage tank, and the like, other than the fuel amount detector 20 that detects the amount of fuel in the fuel tank 4.

Variation 5

In the above-described embodiment, the magnetic sensor 40 outputs to the fuel meter 60 a signal related to an analog amount corresponding to a liquid level of the fuel stored in the fuel tank 4. The CPU 64 in the fuel meter 60 then uses the signal that has been output from the magnetic sensor 40 and represents the analog amount, to determine a fuel amount. However, the magnetic sensor 40 may convert the analog amount corresponding to the liquid level of the fuel stored in the fuel tank 4 into a fuel amount, and output to the CPU 64 a signal corresponding to the fuel amount. The magnetic sensor 40 may convert the analog amount into the fuel amount, with a technique similar to that of the CPU 64 in the above-described embodiment. The CPU 64 may determine the fuel amount from the signal corresponding to the fuel amount, which has been input from the magnetic sensor 40, and display on the display 62 the fuel amount thus determined.

What is claimed is:

1. A liquid level detector comprising:
   a float;
   an arm attached to the float and configured to convert a vertical motion of the float into a rotary motion of the arm;
   a rotator fixed to the arm at a rotation center of the arm;
   a magnet fixed to the rotator;
   a supporter rotatably supporting the rotator; and
   a magnetic sensor covered by the supporter and configured to output a signal corresponding to a rotation of the magnet opposing the magnetic sensor via the supporter,
   wherein
   the supporter comprises:
      a body housing the magnetic sensor and opposing the magnet with a clearance between the body and the magnet;
      a supporting portion disposed along a rotation direction of the arm on an outer circumference side of the magnet and projecting from the body toward the rotator; and
      a flange portion projecting from the supporting portion along an outer circumference direction at a position spaced from the body in a rotational axial direction of the arm, and the rotator comprises:
an engaging portion slidably disposed relative to the flange portion along the rotation direction of the arm and engaging the flange portion so as to regulate a motion of the arm in the rotational axial direction.

2. The liquid level detector as in claim 1, wherein
the supporting portion has a cylindrical shape, and
the supporting portion comprises a communication opening communicating an inner circumference side of the supporting portion and an outer circumference side of the supporting portion, the communication opening being disposed on a body side of the flange portion.

3. The liquid level detector as in claim 2, wherein
the flange portion is disposed on an end of the supporting portion,
the end is opposite to the body,
the supporter comprises a notch arranged across the supporting portion and flange portion and extending from the communication opening to an end, located opposite the body, of the flange portion, and
a length of the engaging portion along the rotation direction of the arm is shorter than a length of the notch along the rotation direction of the arm.

4. The liquid level detector as in claim 3, wherein
the supporting portion comprises a plurality of communication openings,
the plurality of the communication openings is disposed with clearances between one another, and
the supporter comprises a plurality of notches, each of the plurality of the notches extending from a corresponding one of the plurality of communication openings to the end of the flange portion.

5. The liquid level detector as in claim 1, wherein
the supporting portion has a cylindrical shape,
the supporting portion comprises a communication opening communicating an inner circumference side of the supporting portion and an outer circumference side of the supporting portion, the communication opening being disposed on a body side of the flange portion, and
the communication opening is disposed in an upward direction.

* * * * *